United States Patent

Bikowsky

[11] Patent Number: 5,852,737
[45] Date of Patent: Dec. 22, 1998

[54] METHOD AND APPARATUS FOR OPERATING DIGITAL STATIC CMOS COMPONENTS IN A VERY LOW VOLTAGE MODE DURING POWER-DOWN

[75] Inventor: Zeev Bikowsky, Natania, Israel

[73] Assignee: National Semiconductor Corporation, Santa Clara, Calif.

[21] Appl. No.: 777,857

[22] Filed: Dec. 31, 1996

Related U.S. Application Data

[63] Continuation of Ser. No. 427,027, Apr. 24, 1995, abandoned.

[51] Int. Cl.$^6$ .................................................. G06F 1/32
[52] U.S. Cl. ................... 395/750.05; 365/227; 365/228; 264/707
[58] Field of Search ........................... 395/750; 364/707; 365/226–229

[56] References Cited

U.S. PATENT DOCUMENTS

| | | | |
|---|---|---|---|
| 4,322,675 | 3/1982 | Lee et al. ................................. | 323/277 |
| 4,409,665 | 10/1983 | Tubbs .................................... | 395/750 |
| 4,497,036 | 1/1985 | Dunn .................................... | 364/708.1 |
| 4,965,828 | 10/1990 | Ergott, Jr. et al. ....................... | 380/50 |
| 4,984,211 | 1/1991 | Tran ...................................... | 365/229 |
| 5,167,024 | 11/1992 | Smith et al. ............................. | 395/375 |
| 5,203,003 | 4/1993 | Donner .................................... | 395/800 |
| 5,230,074 | 7/1993 | Canova, Jr. ............................. | 395/750 |
| 5,254,888 | 10/1993 | Lee et al. ................................ | 307/480 |
| 5,297,098 | 3/1994 | Nakatani et al. ....................... | 365/226 |
| 5,367,487 | 11/1994 | Yoshida ............................. | 365/189.09 |
| 5,384,747 | 1/1995 | Clohset ................................... | 365/226 |
| 5,388,265 | 2/1995 | Volk ..................................... | 395/750 |
| 5,396,635 | 3/1995 | Fung ..................................... | 395/800 |
| 5,404,543 | 4/1995 | Faucher et al. .......................... | 395/750 |
| 5,463,585 | 10/1995 | Sanada .................................... | 365/201 |
| 5,546,022 | 8/1996 | D'Souza et al. .......................... | 326/87 |
| 5,596,554 | 1/1997 | Hagadorn ................................ | 368/82 |

*Primary Examiner*—Meng-ai T. An
*Assistant Examiner*—Sumati Lefkowitz
*Attorney, Agent, or Firm*—Skjerven, Morrill, MacPherson, Franklin, & Friel; Ken J. Koestner

[57] ABSTRACT

A static CMOS component is operated in a power-down state at the lowest possible voltage that maintains register and internal state levels of the component. A method of operating the static CMOS component includes the steps of selectively supplying a reference voltage at two voltage levels including an operating voltage level and a low reference voltage level, detecting an idle state of the static CMOS component and controlling the selectively supplying step to supply the low reference voltage in response to detection of the idle state. The low reference voltage level is substantially lower than the operating voltage level but is sufficient in voltage amplitude to maintain register and internal state levels of the static CMOS component. An electronic system which performs this method includes a programmable power supply source which selectively supplies an operating voltage and a low voltage which is substantially lower than the operating voltage. The system further includes a static CMOS component which is connected to the programmable power supply source by a power line carrying the selected alternative voltage. The system also includes a system controller connected to the programmable power supply by a power control line which selects the voltage applied to the static CMOS component and by a status line indicative of component status.

26 Claims, 4 Drawing Sheets

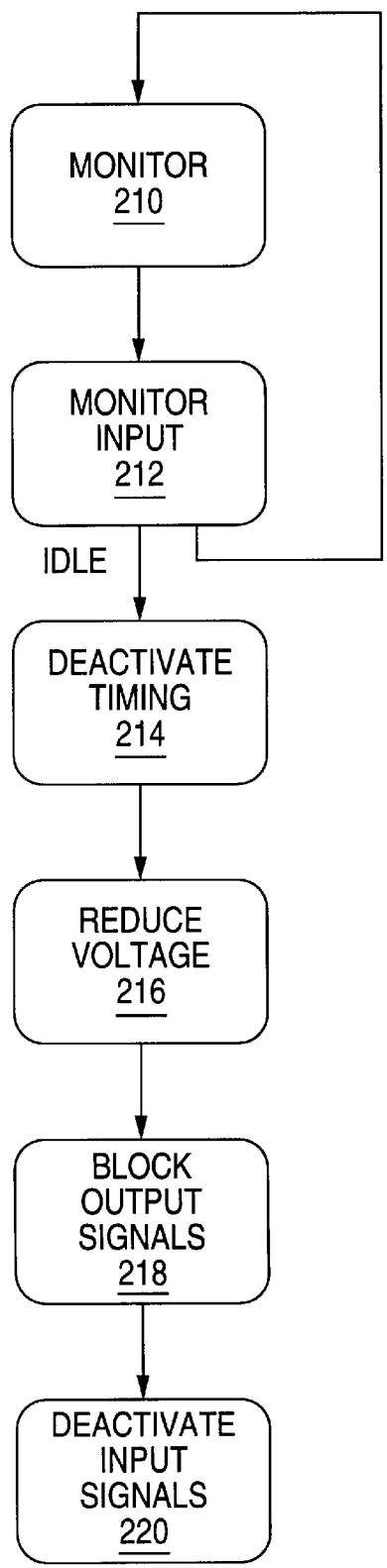
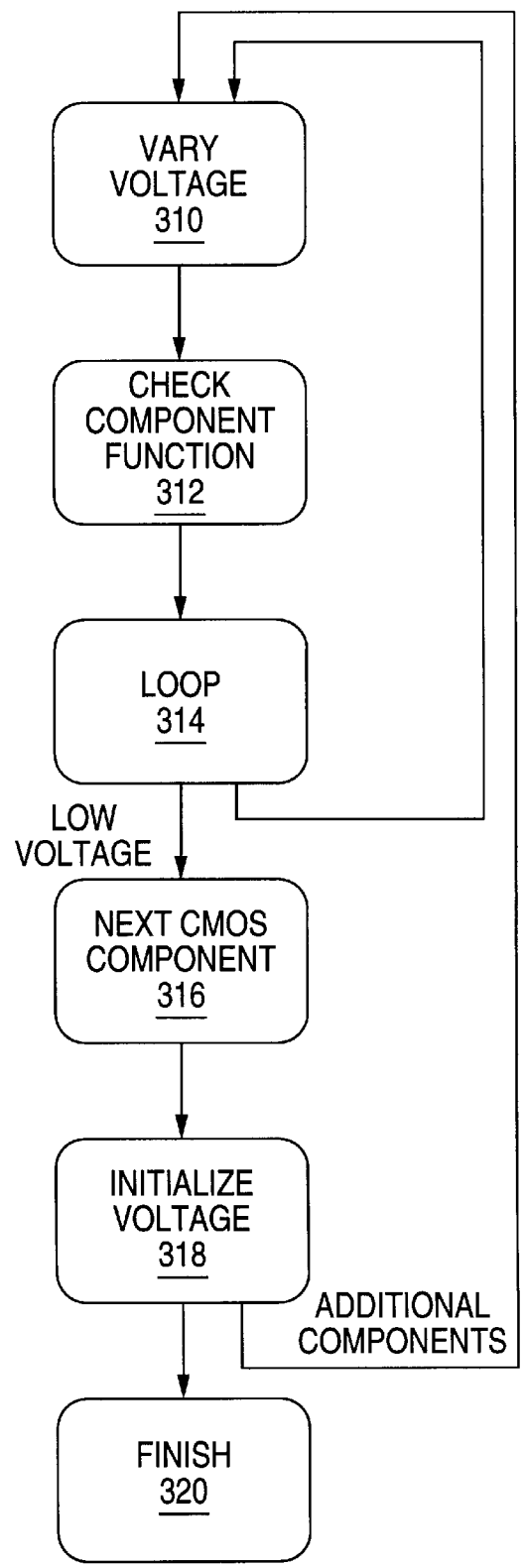
FIG. 2            FIG. 3

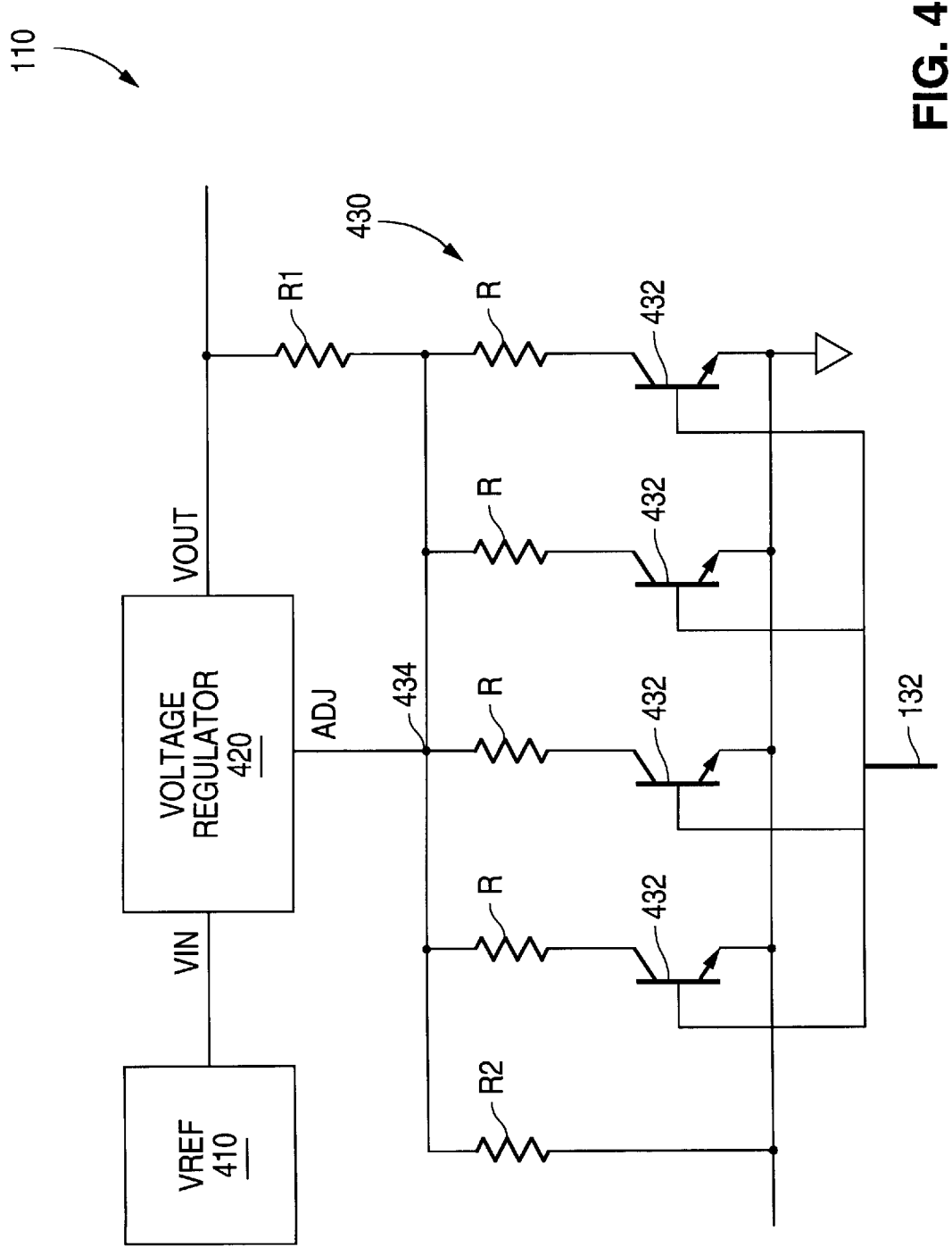

METHOD AND APPARATUS FOR OPERATING DIGITAL STATIC CMOS COMPONENTS IN A VERY LOW VOLTAGE MODE DURING POWER-DOWN

This application is a continuation of application Ser. No. 08/427,027, filed Apr. 24, 1995, now abandoned.

FIELD OF THE INVENTION

This invention relates to digital and static CMOS integrated circuits used in microprocessors and the like and specifically to such integrated circuits that reduce power dissipation by applying a greatly reduced power supply voltage in a power-down state.

BACKGROUND OF THE INVENTION

In high performance microprocessor-based computer systems, the microprocessor operates at a high clock speed. However, the circuits, memories, peripherals, busses and input/output lines which communicate with the microprocessor typically operate at a much lower speed. Often the microprocessor is held in an idle state while the processor clock maintains the same high operating clock speed. Much power is wasted by operating in this manner, since power dissipation is directly related to the clock frequency.

Some microprocessors limit the amount of power wasted by entering a power-down state when the microprocessor is in a wait state. In the power-down state, integrated circuit components are not active but the memories and internal state of the component are maintained. Because the microprocessor operates in the power-down state for the majority of the time in most applications of a high performance computer system, an important current consumption parameter is the power-down consumption value. Accordingly, there is a need to reduce power-down current consumption. Power-down current savings have been achieved using three techniques: (1) deactivating the clock signal to the idle microprocessor, (2) terminating the supply of power to the idle microprocessor, and (3) reducing the voltage level supplying the idle microprocessor to a minimum operating voltage level.

Using the first technique, the activities of a CMOS component are monitored and deactivating the clock signal to the component when the monitored activities meet a predefined level. Because operating frequency is a major influence on power consumption, this technique effectively reduces power dissipation. However, even when the frequency is reduced to 0 Hz, power is dissipated in the form of standby leakage current or DC current due to pull-up resistors.

The second technique, terminating the power supplied to the component, achieves complete cessation of consumption, the lowest possible power dissipation. Unfortunately, the values of memories including state variable are lost when power is terminated so that the memories and state variable must be restored on power-up. The restoration of the component to its previous operating state requires some expenditure of time for reading of values from memory to the component memories. In many applications, the restoration time is not tolerable.

The third technique of reducing the voltage to the minimum operating voltage level does prevent some power dissipation but the savings are minimal because the Vcc reference voltage level cannot be lowered to less than approximately 3V. The 3V level is necessary because the external I/O standard voltage is TTL level in which the output signals of the integrated circuit should have a 2.4V level in the high logic state. A standard CMOS component must operate at a standard voltage level in a range approximately from 3V to 3.6V to drive the TTL level standard due to voltage drops and the influence of noise.

Accordingly, there is a need for a better way of reducing current drain and power dissipation.

SUMMARY OF THE INVENTION

In accordance with a first embodiment of the invention, a method of operating a static CMOS component includes the steps of selectively supplying a reference voltage at two voltage levels including an operating voltage level and a low reference voltage level, detecting an idle state of the static CMOS component and controlling the selectively supplying step to supply the low reference voltage in response to detection of the idle state. The low reference voltage level is substantially lower than the operating voltage level but is sufficient in voltage amplitude to maintain register and internal state levels of the static CMOS component.

In accordance with a second embodiment of the invention, an electronic system includes a programmable power supply source which selectively supplies an operating voltage and a low voltage which is substantially lower than the operating voltage. The system further includes a static CMOS component which is connected to the programmable power supply source by a power line carrying the selected alternative voltage. The system also includes a system controller connected to the programmable power supply by a power control line which selects the voltage applied to the static CMOS component and by a status line indicative of component status.

The lowering of the applied reference voltage to the lowest possible value that maintains the register and internal state levels of the component achieves several advantages. One advantage is that lowering the voltage provides the system user with additional operating time in battery-powered systems and reduces power consumption in general. A second advantage is that no restoration or initialization of the system state is necessary upon powering the component following a power-down state. Another advantage is that CMOS components are powered with a reference voltage below the standard reference voltage during power-down operation so that power is conserved while memories, registers, flip-flops and state variables in-general are retained. A further advantage is that, although the system conserves power by reducing reference voltage levels below the minimum operating volt level, signals having suitable voltage levels are steadily furnished to input/output circuits utilizing TTL levels. These advantages are attained to conserve power in battery-powered systems as well as in systems which utilize "power-hungry" components.

This invention will be more fully understood in light of the following detailed description taken together with the drawings.

DESCRIPTION OF THE DRAWINGS

FIG. 2 depicts a flow chart of a method of operating a static CMOS component in a very low voltage state.

FIG. 3 depicts a flow chart of a method of determining a suitable voltage for operating a static CMOS component in the very low voltage state.

FIG. 4 illustrates a schematic block diagram of an embodiment of a programmable power supply source in accordance with the electronic system shown in FIG. 1.

DETAILED DESCRIPTION OF THE PREFERRED EMBODIMENT

Figure 1:
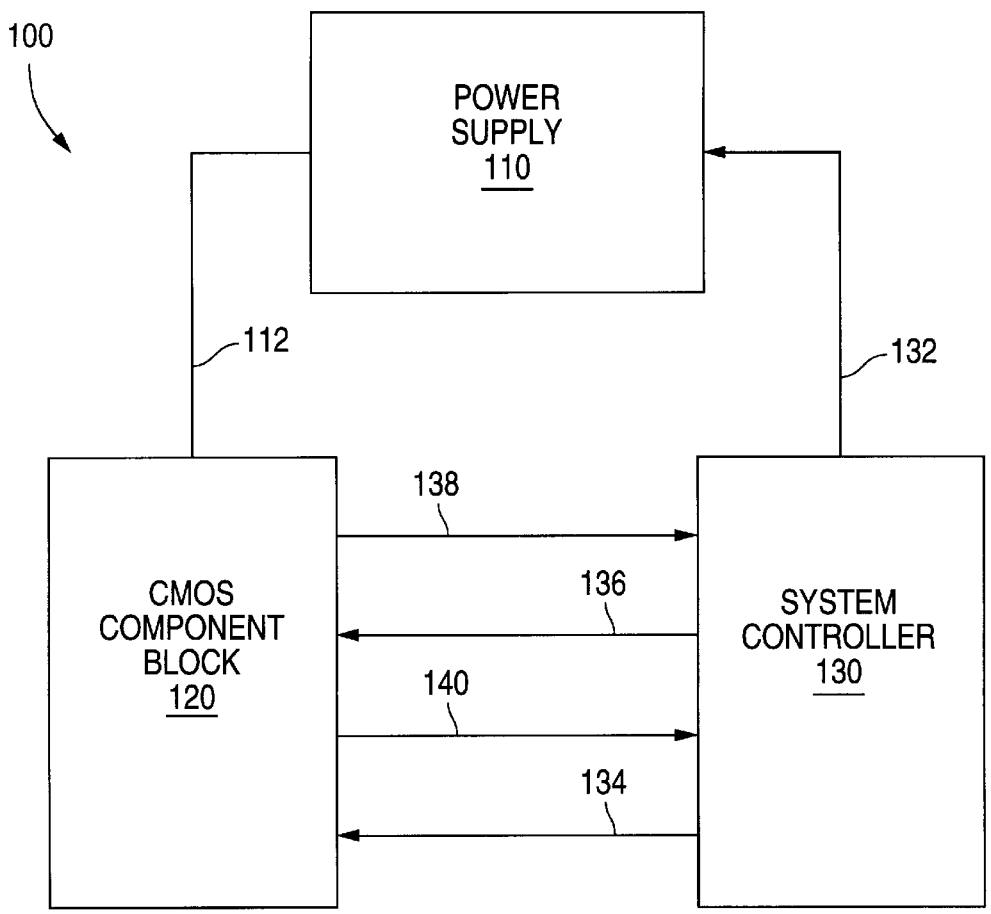
FIG. 1 illustrates a schematic block diagram of an embodiment of an electronic system which operates at a very low voltage level during power-down.

Referring to FIG. 1, a schematic block diagram is shown of an electronic system 100 which is adapted for operating at a very low voltage level during power-down. The electronic system 100 includes a programmable power supply source 110, a static CMOS component block 120 and a system controller 130.

System controller 130 selectively programs the programmable power supply source 110 to generate either an operating voltage, for example 5V, or a low voltage which is substantially lower than the operating voltage but which is sufficient to maintain register and internal state levels in a component of the static CMOS component block 120. The system controller 130 sends voltage control signals to the programmable power supply source 110 over power control lines 132. The system controller 130 drives the timing of the CMOS component block 120 using component clock line 134 which supplies timing signals to the CMOS component block 120. In addition, the system controller 130 sets and applies various control signals and data input signals to the CMOS component block 120 over component input lines 136. The system controller 130 receives control signals and data from the CMOS component block 120 via component output lines 138. System controller 130 also receives an idle status control signal from the CMOS component block 120 over idle status lines 140.

The CMOS component block 120 is powered by a power line 112 which carries a programmable reference voltage from the programmable power supply source 110. The programmable reference voltage is a voltage selected from a predefined range of voltages. For example, in one embodiment the programmable reference voltage ranges from approximately 1.5V to 5.0V. In various embodiments, power line 112, power control lines 132, component clock line 134, component input lines 136, component output lines 136 and idle status lines 140 may include a single communication line or multiple lines.

The programmable power supply source 110 includes a circuit (not shown) which sets an output voltage signal on power line 112 that varies as a function of a digital input signal applied to power control lines 132 by the system controller 130. Programmable power supply source 110 optionally includes several such voltage selecting circuits that are independent from one another. The independent voltage selecting circuits are respectively connected to ones of several independent power lines in the power line 112. The several independent power lines in the power line 112 are respectively connected to ones of several CMOS components (not shown) in the CMOS component block 120 so that the system controller 130 can individually and independently control the supply voltage to several CMOS components.

In some embodiments, the static CMOS component block 120 includes a single CMOS component having operating power supplied by a single power line in power line 112. In other embodiments, the static CMOS component block 120 includes several CMOS components, all supplied with operating power by a single power line in power line 112 which powers all of the components so that the same voltage is applied to each of the components. In still other embodiments, the static CMOS component block 120 includes several CMOS components supplied with operating power by several power lines in power line 112. In some of the multiple component, multiple power line embodiments, each component is independently supplied with a separate power line. In other multiple component, multiple power line embodiments, some power lines are shared between particular ones of the multiple components. In further additional embodiments, all of the multiple static CMOS components are powered by independent and separate power lines 112 from the programmable power supply source 110 and the voltages applied on the separate power lines 112 are set independently of one another.

Multiple static CMOS component embodiments may, for example, include a central processing unit such as a microprocessor and an input/output controller. Static CMOS components are utilized because any digital component that is implemented as a fully static component is operable when a voltage lower than 3V is supplied. Thus, fully static CMOS components are utilized so that power to the component is reduced below 3V during a power-down condition of the component. Component clock line 134, component input lines 136, component output lines 136 and idle status line 140 are applied independently to a each static CMOS component.

Thus, in various embodiments one or more static CMOS components are connected to various voltage selecting circuits in the programmable power supply source 110 by various power lines in power line 112. The voltage selecting circuits and power lines are variously shared or utilized independently among components. Each static CMOS component is connected to the system controller 130 by an idle status line 140, a component clock line 134, component input lines 136 and component output lines 138 which are independent from the lines of other components of the multiple CMOS components so that each of the multiple static CMOS components is controlled independently from the other static CMOS components although power may be shared among components.

Referring to the flowchart shown in FIG. 2 in conjunction with the schematic circuit diagram illustrated in FIG. 1, a method by which the system controller 130 controls the operation of a component of the static CMOS component block 120 is depicted. The system controller 130 alternatively supplies either an operating voltage level or a low voltage to the component. The low voltage level is substantially lower than the operating voltage level but is sufficient to maintain register and internal state levels within the component. In monitor step 210, the system controller 130 monitors the activity of the components of the static CMOS component by sensing the idle status line 140 for each CMOS component. When the idle status is asserted, system controller 130 determines whether information on an external bus (not shown) is directed to the component via the component input lines 136 for the component in monitor input step 212. Accordingly, the system controller 130 detects an idle state of a static CMOS component by determining whether new information is available on an external bus (not shown) to the static CMOS component, determining whether the static CMOS component is currently idle and classifying the state of the static CMOS component as the idle state when new information is not available on the external bus and the static CMOS component is currently idle. Upon detecting an idle state of the static CMOS component, the system controller 130 deactivates a timing signal to the static CMOS component in deactivate timing step 214 and controls the programmable power supply source 110 to gradually reduce the voltage applied to the idle static CMOS component from the operating voltage level to the low voltage level in reduce voltage step 216. The voltage is gradually reduced to avoid ringing effects in the component. The system controller 130 blocks a signal on an output pins of the static CMOS component as the voltage is reduced in block output signals step 218 and forces the signals on the input pins to the static CMOS component to an inactive state in deactivate input signals step 220.

The signals on the output pins of the static CMOS component are blocked and the signals on the input pins to the static CMOS component are forced to an inactive state when the voltage is reduced so that there is no attempt to drive external TTL level input/output driver circuits with a voltage less than 2.4V. One technique for otherwise isolating the powered-down CMOS component from the external TTL level input/output driver circuits involves operating an internal CMOS component at a lower voltage and operating the external TTL level input/output driver circuits at a higher level (e.g. 2.4V). However, this technique utilizes two voltage sources or an internal regulator to independently supply reference voltages to the internal CMOS circuits and the external TTL level input/output circuits. Furthermore, this technique disadvantageously requires modification to all components of the system 100.

In some embodiments or circumstances, the low voltage level is defined by a system designer. In other embodiments, the low reference voltage is automatically calibrated to find a suitable low reference voltage for a particular static CMOS component. Referring to FIG. 3, a method for automatically calibrating a low reference voltage is described. To calibrate the low voltage level, the system controller 130 controls the programmable power supply source 110 to vary the voltage applied to the static CMOS component in vary voltage step 310. In check component functionality step 312, the system controller 130 checks the functionality of the static CMOS component for particular applied voltage levels of the varied voltage. More specifically for some components, the system controller 130 controls the programmable power supply source 110 to vary the voltage applied to the static CMOS component and checks for retention of data in memories or registers within the static CMOS component for particular voltage levels of the varied voltage. In loop step 314, the system controller 130 branches to the vary voltage step 310 unless a particular functional condition is found. When the particular defined low-voltage functional condition of a component is found, system controller 130 checks for more components in next CMOS component step 316. If additional components are to be tested, the system controller 130 initializes the operating voltage to the new component in initialize voltage step 318 and branches to the vary voltage step 310. If no additional components are to be tested, the system controller exits the calibrating method in finish step 320. Individual and independent calibration of the different CMOS components allows the different components to be operated at different low power voltages so that all inactivated components are fully inactive but all components are suitably supplied with a voltage capable of retaining memories, register values and other functionality. The system controller 130 typically calibrates the low reference voltage during a system bootstrap operation.

Referring to FIG. 4, an embodiment of the programmable power supply source 110 includes a reference voltage generator 410, a voltage regulator 420 and a digital to analog converter (DAC) 430. A suitable voltage regulator 420 is an LM117H/LM317HV 3-terminal adjustable regulator, which is manufactured by National Semiconductor Corporation, Santa Clara, Calif. The reference voltage generator 410, for example a 5 volt generator, supplies an input voltage to a $V_{IN}$ terminal of the voltage regulator 420. The voltage regulator 420 supplies an output voltage at a $V_{OUT}$ terminal which is connected to a one of the one or more lines of power line 112. The illustrative DAC 430 includes a network of npn bipolar transistors 432 and resistors R. Each npn bipolar transistor 432 is connected in series with resistors R and the multiple transistor-resistor pairs are connected in parallel between ground and a node 434. The node 434 is connected to an adjust terminal of the voltage regulator 420 and to the $V_{OUT}$ terminal of the voltage regulator 420 through a resistor R1. The multiple transistor-resistor pairs are also connected in parallel with a resistor R2. The base terminals of each of the transistors 432 are connected to individual lines of the power control lines 132 which are supplied from the system controller 130. In multiple voltage embodiments of the programmable power supply source 110, several of the circuits shown in FIG. 4 are employed to supply reference voltages to several lines of power line 112.

Figure 5:
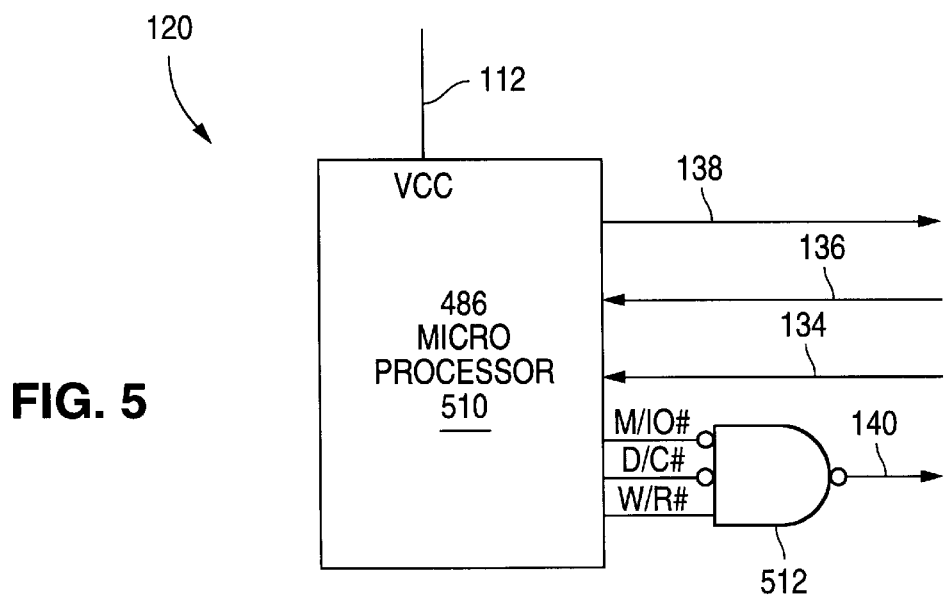
FIG. 5 illustrates a schematic block diagram of an embodiment of a static CMOS component in accordance with the electronic system shown in FIG. 1.

Referring to FIG. 5, an embodiment of a static CMOS component 120 includes an 486 microprocessor 510 such as those manufactured by Intel and Advanced Micro Devices, Inc. The microprocessor 510 receives operating power at a VCC terminal which is connected to a line of power line 112 and receives a timing signal at a CLK terminal which is connected to the component clock line 134. The idle status line 140 from the microprocessor 510 to the system controller 130 is generated, for example, by connecting a memory/input-output (M/IO#) pin, a data/control (D/C#) pin and a write/read (W/R#) pin of the microprocessor 510 to a three-input NAND gate 512. The output terminal of the NAND gate 512 is connected to the idle status line 140.

Microprocessor 510 is placed in an idle state by executing a HALT instruction. A halt instruction stops instruction execution and places the processor in a HALT state. An enabled interrupt, nonmaskable interrupt (NMI), or a reset resumes processor execution. If an interrupt (including NMI) is used to resume execution after a HALT instruction, an instruction pointer (CS:EIP) which is saved in the microprocessor points to the instruction following the HALT instruction. In a HALT state, the bus cycle definition on memory/input-output (M/IO#) pin, data/control (D/C#) pin and write/read (W/R#) pin are respectively 001. Input signals to the NAND gate 512 are inverted so that the 001 halt code suitably controls the idle status line 140. Component output lines 138 include lines which are connected to the address bus A3-A2 and byte enable signals BE3#-BE0#, parity status PCHK#, bus lock LOCK# and PLOCK#, address status bus control signal (ADS#), burst last signal (BLAST#) and other 486 output signals. Component output lines 138 are ignored by the system controller 130 in the low power state. Component input lines 136 include lines which are connected to the address bus A31-A4, data bus D31-D0, data parity bus DP0-DP3, non-burst ready (RDY#), burst ready (BRDY#) and other 486 input signals. Component input lines 136 also include interrupt handling lines including RESET, maskable interrupt (INTR) and nonmaskable interrupt lines (NMI). System controller 130 applies nonactive signals to the component input lines 136 in the low power state. System controller 130 returns the microprocessor 510 from the low power state to an operating state by asserting an interrupt handling line such as the component input lines 136 which are connected to the INTR and NMI lines.

Figure 6:
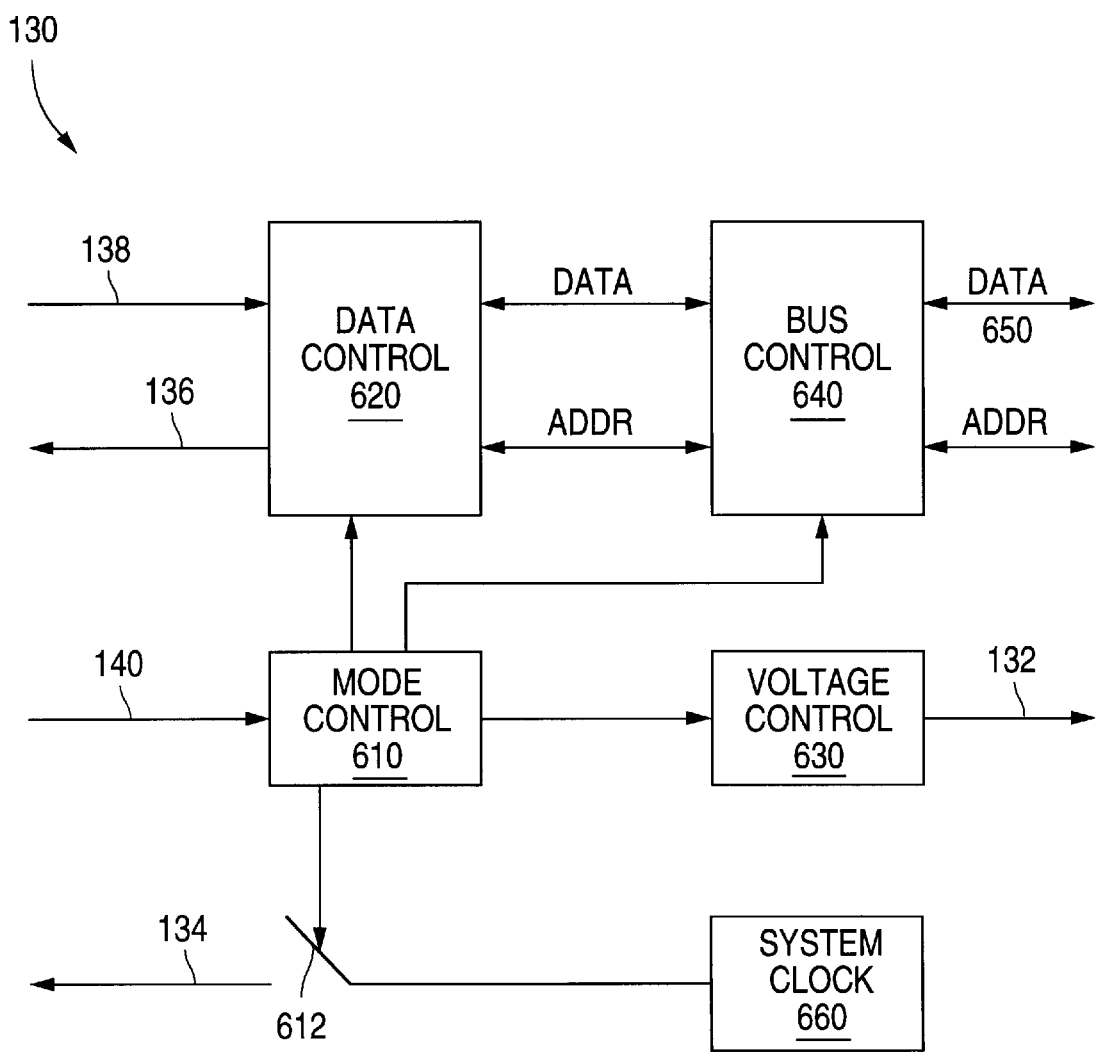
FIG. 6 illustrates a schematic block diagram of an embodiment of a system controller in accordance with the electronic system shown in FIG. 1.

Referring to FIG. 6, an embodiment of a system controller 130 includes a mode controller 610, a data controller 620, a voltage controller 630 and a bus controller 640. The mode controller 610 is connected to the idle status line 140. When the idle signal is asserted, the mode controller 610 interacts with the buscontroller 640 to determine whether a data bus 650 is carrying signals destined for the CMOS component. If no external data is applied to the CMOS component, the mode controller 610 controls a switch 612 which disconnects a system clock generator 660 from the component clock line 134. The mode controller 610 then interacts with the voltage controller 630 to decrease the voltage applied to the CMOS component in a gradual manner. The voltage controller 630 does this by changing the digital codes applied to power control lines 132. The mode controller 610 interacts with the data controller 620 to inactivate the signals on the component output lines 138 so that the signals are not placed on the data bus 650. Furthermore, the mode controller 610 interacts with the data controller 620 to set the signals on the component input lines 136 to an inactive level.

The description of certain embodiments of this invention is intended to be illustrative and not limiting. Numerous other embodiments will be apparent to those skilled in the art, all of which are included within the broad scope of this invention. The apparatus and method according to this invention are not confined to application with microprocessor, but also apply to various other CMOS components including memories, interfaces, I/O controllers, device driver circuits and the like.

I claim:

1. A method of operating a static CMOS component comprising the steps of:

selectively supplying a reference voltage at two voltage levels including an operating voltage level and a low reference voltage substantially lower than the operating voltage level but sufficient to maintain register and internal state levels of the static CMOS component;

detecting an idle state of the static CMOS component;

controlling the selectively supplying step to supply the low reference voltage in response to detection of the idle state; and calibrating the low reference voltage pertaining to the static CMOS component in a suboperation included in a system bootstrap operation.

2. A method according to claim 1 further comprising the step of:

deactivating a timing signal to the static CMOS component in response to detecting an idle state of the static CMOS component.

3. A method according to claim 2 wherein the controlling step comprises the step of:

controlling the selectively supplying step to gradually reduce the voltage from the operating voltage level to the low voltage level subsequent to the timing signal deactivating step.

4. A method according to claim 3 further comprising the step of:

blocking a signal on an output pin of the static CMOS component in response to detecting an idle state of the static CMOS component as the voltage is reduced.

5. A method according to claim 2 further comprising the step of:

blocking a signal on an output pin of the static CMOS component in response to detecting an idle state of the static CMOS component.

6. A method according to claim 2 further comprising the step of:

forcing a signal on an input pin to the static CMOS component to an inactive state in response to detecting an idle state of the static CMOS component.

7. A method according to claim 1, wherein the step of detecting an idle state comprises the steps of:

determining whether new information is available on an external bus to the static CMOS component;

determining whether the static CMOS component is currently idle; and classifying the state of the static CMOS component as the idle state when new information is not available on the external bus and the static CMOS component is currently idle.

8. A method according to claim 1 wherein the step of calibrating the low reference voltage comprises the steps of:

varying the voltage applied to the static CMOS component;

checking retention of data in a memory within the static CMOS component for particular voltage levels of the varied voltage.

9. A method according to claim 1 wherein the step of calibrating the low reference voltage comprises the steps of:

varying the voltage applied to the static CMOS component;

checking functionality of the static CMOS component for particular voltage levels of the varied voltage.

10. A method according to claim 1 further wherein the supplying, detecting and controlling steps are performed independently for a plurality of static CMOS components.

11. A method according to claim 10 further comprising the step of calibrating the low reference voltage pertaining to each of the plurality of static CMOS components independently with respect to each static CMOS component.

12. An electronic system comprising:

a static CMOS component;

a programmable power supply source coupled to the static CMOS component by a power line, the programmable power source selectively supplying to the static CMOS component an operating voltage and a low voltage substantially lower than the operating voltage but sufficient to maintain register and internal state levels of the static CMOS component; and a system controller coupled to the programmable power supply by a power control line for selecting the supplied voltage and coupled to the static CMOS component by a status line indicative of component status, the system controller calibrating the low reference voltage pertaining to the static CMOS component in a suboperation included in a system bootstrap operation.

13. A system according to claim 12 wherein the system controller is further coupled to the static CMOS component by a component clock line supplying timing signals to the CMOS component.

14. A system according to claim 12 wherein the system controller is further coupled to the static CMOS component by a component input line and a component output line respectively carrying signals from the system controller to the CMOS component and from the CMOS component to the system controller.

15. A system according to claim 12 wherein the static CMOS component is a first component of a plurality of static CMOS components.

16. A system according to claim 12 wherein the plurality of static CMOS components includes a central processing unit (CPU) and an input/output controller.

17. A system according to claim 12 wherein the static CMOS component is a first component of a plurality of static CMOS components, each static CMOS component being coupled to the programmable power supply source by a power line independent from the power lines of other components of the plurality of static CMOS components and each static CMOS component being coupled to the system controller by a status line, a component clock line, a component input line and a component output line independent from the lines of other components of the plurality of CMOS components so that each of the plurality of static CMOS components is controlled and powered independent of the other static CMOS components.

18. A system according to claim 12 wherein the static CMOS component further includes:
a detector for monitoring for an idle indication of the static CMOS component.

19. A system according to claim 12 wherein the system controller further includes:
a mode controller for selectively activating and deactivating the timing signal to the static CMOS component.

20. A system according to claim 12 wherein the system controller further includes:
a voltage controller for selecting an applied power signal between the operating voltage and the low voltage substantially lower than the operating voltage.

21. A system according to claim 12 wherein the system controller further includes:
a data controller for blocking a signal on an output pin of the static CMOS component in response to detecting an idle state of the static CMOS component.

22. A system according to claim 12 wherein the system controller further includes:
a data controller for forcing a signal on an input pin to the static CMOS component to an inactive state in response to detecting an idle state of the static CMOS component.

23. A method of operating a static CMOS component comprising the steps of:
selectively supplying a reference voltage at a plurality of voltage levels including an operating voltage level and a low reference voltage which is substantially lower than the operating voltage level but sufficient to maintain register and internal state levels of a static CMOS component;
detecting an idle state of the static CMOS component;
controlling the selectively supplying step to supply the low reference voltage in response to detection of the idle state;
maintaining the register and internal state levels of the static CMOS component by supplying the low reference voltage; and
calibrating the low reference voltage pertaining to the static CMOS component in a suboperation included in a system bootstrap operation.

24. An electronic system comprising:
a static CMOS component;
a programmable power supply source coupled to the static CMOS component by a power line, the programmable power source supplying to the static CMOS component a voltage selected from a plurality of voltages including an operating voltage and a low voltage substantially lower than the operating voltage but sufficient to maintain register and internal state levels of a static CMOS component; and
a system controller coupled to the programmable power supply by a power control line for selecting the supplied voltage and coupled to the static CMOS component by a status line indicative of component status including an active status and an idle status, the system controller including:
a control logic responsive to the idle status signal on the status line by selecting the low voltage substantially lower than the operating voltage but sufficient to maintain register and internal state levels of the static CMOS component, the control logic calibrating the low reference voltage pertaining to the static CMOS component in a suboperation included in a system bootstrap operation.

25. A method of operating a static CMOS processor comprising the steps of:
selectively supplying a reference voltage at a plurality of voltage levels including an operating voltage level and a low reference voltage which is substantially lower than the operating voltage level but sufficient to maintain register and internal state levels of a static CMOS processor;
detecting an idle state of the static CMOS processor;
controlling the selectively supplying step to supply the low reference voltage in response to detection of the idle state;
maintaining the register and internal state levels of the static CMOS processor by supplying of the low reference voltage; and
calibrating the low reference voltage pertaining to the static CMOS processor in a suboperation included in a system bootstrap operation.

26. An electronic system comprising:
a static CMOS processor;
a programmable power supply source coupled to the static CMOS processor by a power line, the programmable power source supplying to the static CMOS processor a voltage selected from a plurality of voltages including an operating voltage and a low voltage substantially lower than the operating voltage but sufficient to maintain register and internal state levels of a static CMOS processor; and
a system controller coupled to the programmable power supply by a power control line for selecting the supplied voltage and coupled to the static CMOS processor by a status line indicative of processor status including an active status and an idle status, the system controller including:
a control logic responsive to an idle status signal on the status line by selecting the low voltage substantially lower than the operating voltage but sufficient to maintain register and internal state levels of the static CMOS processor, the control logic calibrating the low reference voltage pertaining to the static CMOS component in a suboperation included in a system bootstrap operation.

* * * * *